US009361130B2

(12) United States Patent
SanGiovanni et al.

(10) Patent No.: US 9,361,130 B2
(45) Date of Patent: Jun. 7, 2016

(54) SYSTEMS, METHODS, AND COMPUTER PROGRAM PRODUCTS PROVIDING AN INTEGRATED USER INTERFACE FOR READING CONTENT

(75) Inventors: John SanGiovanni, Seattle, WA (US); Benjamin B. Bederson, Chevy Chase, MD (US)

(73) Assignee: APPLE INC., Cupertino, CA (US)

( * ) Notice: Subject to any disclaimer, the term of this patent is extended or adjusted under 35 U.S.C. 154(b) by 995 days.

(21) Appl. No.: 12/772,738

(22) Filed: May 3, 2010

(65) Prior Publication Data

US 2012/0254745 A1   Oct. 4, 2012

(51) Int. Cl.
| | |
|---|---|
| *G06F 9/44* | (2006.01) |
| *G06F 3/0485* | (2013.01) |
| *G06F 17/30* | (2006.01) |
| *G06F 3/0488* | (2013.01) |
| *G06F 17/21* | (2006.01) |

(52) U.S. Cl.
CPC ............ *G06F 9/4443* (2013.01); *G06F 3/0485* (2013.01); *G06F 17/30716* (2013.01); *G06F 3/04886* (2013.01); *G06F 17/211* (2013.01); *G06F 17/30017* (2013.01); *G06F 17/30696* (2013.01); *G06F 17/30905* (2013.01)

(58) Field of Classification Search
CPC ... G06F 3/016; G06F 3/0488; G06F 3/04886; G06F 3/04883; G06F 3/0481; G06F 17/30017; G06F 17/211; G06F 17/30696; G06F 17/30796; G06F 17/30011; G06F 17/212; G06F 17/30716; G06F 17/30253
USPC .................................................. 715/784–787
See application file for complete search history.

(56) References Cited

U.S. PATENT DOCUMENTS

| | | | |
|---|---|---|---|
| 4,899,292 A | * | 2/1990 | Montagna et al. |
| 5,414,809 A | | 5/1995 | Hogan et al. |
| 5,487,167 A | | 1/1996 | Dinallo et al. |
| 5,623,589 A | * | 4/1997 | Needham .......... G06F 17/30873 707/E17.111 |
| 5,659,742 A | * | 8/1997 | Beattie et al. |
| 5,712,995 A | | 1/1998 | Cohn |
| 5,742,816 A | * | 4/1998 | Barr et al. ..................... 707/728 |

(Continued)

OTHER PUBLICATIONS

International Search Report and Written Opinion issued for PCT/US2011/035010, dated Jul. 19, 2011, 7 pages.

(Continued)

*Primary Examiner* — Patrick Riegler
*Assistant Examiner* — Phoebe Pan
(74) *Attorney, Agent, or Firm* — Morgan, Lewis & Bockius LLP

(57) ABSTRACT

A method performed by a portable, processor-based device with a display screen is disclosed. The method includes rendering a Graphical User Interface (GUI) on the display screen. The GUI includes a first scrollable column with a plurality of graphical elements arranged sequentially within the first column, each graphical element of the plurality of graphical elements associated with at least one article of a plurality of articles. The GUI also includes a second scrollable column with a plurality of independent text portions, each of the text portions corresponding to a respective article. The method further includes coordinating the first and second scrollable columns so that when a first article is selected a first text portion associated with the first article is displayed on the display screen, and a first graphical element associated with the first article is displayed next to the first text portion.

21 Claims, 6 Drawing Sheets

(56) References Cited

U.S. PATENT DOCUMENTS

| | | | |
|---|---|---|---|
| 5,748,931 A * | 5/1998 | Jones | G06F 3/0481 715/853 |
| 5,929,848 A * | 7/1999 | Albukerk et al. | 715/700 |
| 5,930,809 A * | 7/1999 | Middlebrook | 715/780 |
| 5,960,448 A * | 9/1999 | Reichek et al. | 715/236 |
| 5,991,751 A * | 11/1999 | Rivette et al. | |
| 5,995,978 A * | 11/1999 | Cullen et al. | |
| 6,014,643 A | 1/2000 | Minton | |
| 6,018,749 A * | 1/2000 | Rivette et al. | 715/202 |
| 6,026,409 A * | 2/2000 | Blumenthal | |
| 6,029,146 A | 2/2000 | Hawkins et al. | |
| 6,058,379 A | 5/2000 | Odom et al. | |
| 6,061,695 A | 5/2000 | Slivka et al. | |
| 6,141,007 A * | 10/2000 | Lebling | G06F 17/30716 707/E17.093 |
| 6,369,811 B1 * | 4/2002 | Graham et al. | 715/764 |
| 6,415,307 B2 * | 7/2002 | Jones et al. | 715/202 |
| 6,421,694 B1 | 7/2002 | Nawaz et al. | |
| 6,442,574 B1 | 8/2002 | Schumacher et al. | |
| 6,466,237 B1 | 10/2002 | Miyao et al. | |
| 6,581,070 B1 * | 6/2003 | Gibbon | G06F 17/30796 |
| 6,625,583 B1 | 9/2003 | Silverman et al. | |
| 6,667,810 B1 | 12/2003 | Jeyachandran et al. | |
| 6,727,930 B2 | 4/2004 | Currans et al. | |
| 6,738,084 B1 * | 5/2004 | Kelley et al. | 715/784 |
| 6,748,385 B1 | 6/2004 | Rodkin et al. | |
| 6,920,613 B2 * | 7/2005 | Dorsey et al. | 715/714 |
| 7,076,457 B2 | 7/2006 | Yamamoto et al. | |
| 7,092,939 B2 | 8/2006 | Koll | |
| 7,117,523 B2 | 10/2006 | Kasahara et al. | |
| 7,228,492 B1 * | 6/2007 | Graham | 715/234 |
| 7,331,517 B2 | 2/2008 | Inakoshi et al. | |
| 7,346,668 B2 | 3/2008 | Willis | |
| 7,356,760 B2 * | 4/2008 | Jaeger | 715/246 |
| 7,370,283 B2 | 5/2008 | Othmer | |
| 7,430,724 B2 | 9/2008 | Othmer | |
| 7,493,499 B1 | 2/2009 | Deaver et al. | |
| 7,580,702 B2 | 8/2009 | Othmer | |
| 7,606,444 B1 * | 10/2009 | Erol et al. | 382/305 |
| 7,756,871 B2 * | 7/2010 | Yacoub et al. | 707/736 |
| 7,770,099 B2 * | 8/2010 | Young | G06F 9/4443 707/999.001 |
| 7,787,818 B2 | 8/2010 | Shapiro et al. | |
| 7,912,829 B1 * | 3/2011 | Mathes et al. | 707/707 |
| 7,933,338 B1 * | 4/2011 | Choudhry | G06F 17/30781 375/240.26 |
| 7,933,632 B2 | 4/2011 | Flynt et al. | |
| 8,042,063 B1 * | 10/2011 | Lin-Hendel | G06F 3/0482 715/805 |
| 8,131,626 B2 | 3/2012 | Langridge | |
| 8,176,515 B2 * | 5/2012 | Ahmad et al. | 725/43 |
| 8,301,586 B1 | 10/2012 | Lattyak et al. | |
| 8,402,374 B1 | 3/2013 | Rose | |
| 8,560,485 B2 | 10/2013 | Labrou et al. | |
| 8,739,019 B1 * | 5/2014 | Nevins | G06F 3/013 715/203 |
| 2001/0004256 A1 * | 6/2001 | Iwata et al. | 345/204 |
| 2001/0047373 A1 * | 11/2001 | Jones et al. | 707/515 |
| 2002/0035697 A1 | 3/2002 | McCurdy et al. | |
| 2002/0083064 A1 | 6/2002 | Davis et al. | |
| 2002/0090934 A1 | 7/2002 | Mitchelmore | |
| 2002/0156719 A1 | 10/2002 | Finebaum et al. | |
| 2003/0014445 A1 * | 1/2003 | Formanek et al. | 707/526 |
| 2003/0020671 A1 | 1/2003 | Santoro et al. | |
| 2003/0079177 A1 | 4/2003 | Brintzenhofe et al. | |
| 2003/0187954 A1 | 10/2003 | Wen et al. | |
| 2003/0189731 A1 | 10/2003 | Chang | |
| 2003/0191696 A1 | 10/2003 | Yamamoto et al. | |
| 2003/0200507 A1 * | 10/2003 | Stern et al. | 715/517 |
| 2004/0039589 A1 | 2/2004 | Lee | |
| 2004/0068458 A1 | 4/2004 | Russo | |
| 2004/0078814 A1 | 4/2004 | Allen | |
| 2004/0090462 A1 * | 5/2004 | Graham | G06F 17/30017 715/767 |
| 2004/0095376 A1 * | 5/2004 | Graham et al. | 345/716 |
| 2004/0098671 A1 * | 5/2004 | Graham | G06F 17/30017 715/274 |
| 2004/0168206 A1 | 8/2004 | Stienstra | |
| 2004/0175036 A1 * | 9/2004 | Graham | 382/173 |
| 2004/0268413 A1 | 12/2004 | Reid et al. | |
| 2005/0034068 A1 * | 2/2005 | Jaeger | 715/517 |
| 2005/0066268 A1 | 3/2005 | Bieber | |
| 2005/0091574 A1 * | 4/2005 | Maaniitty | G06F 3/0484 715/255 |
| 2005/0134578 A1 * | 6/2005 | Chambers | G06F 3/0485 345/184 |
| 2005/0198056 A1 * | 9/2005 | Dumais | G06F 17/30867 |
| 2005/0262448 A1 | 11/2005 | Vronay et al. | |
| 2005/0267873 A1 | 12/2005 | Kettner et al. | |
| 2005/0283734 A1 | 12/2005 | Santoro et al. | |
| 2005/0289468 A1 | 12/2005 | Kahn et al. | |
| 2006/0020596 A1 | 1/2006 | Liu et al. | |
| 2006/0085741 A1 | 4/2006 | Weiner et al. | |
| 2006/0213976 A1 | 9/2006 | Inakoshi et al. | |
| 2006/0236261 A1 * | 10/2006 | Forstall et al. | 715/784 |
| 2006/0253459 A1 | 11/2006 | Kahn et al. | |
| 2006/0277488 A1 * | 12/2006 | Cok | G06F 3/04855 715/784 |
| 2007/0055931 A1 * | 3/2007 | Zaima et al. | 715/526 |
| 2007/0079236 A1 | 4/2007 | Schrier et al. | |
| 2007/0082707 A1 | 4/2007 | Flynt et al. | |
| 2007/0104366 A1 | 5/2007 | Sprague et al. | |
| 2007/0198741 A1 | 8/2007 | Duffy et al. | |
| 2007/0220607 A1 | 9/2007 | Sprosts et al. | |
| 2007/0245251 A1 | 10/2007 | Kim et al. | |
| 2007/0256024 A1 * | 11/2007 | Schell et al. | 715/762 |
| 2007/0260586 A1 | 11/2007 | Savona et al. | |
| 2008/0052742 A1 | 2/2008 | Kopf et al. | |
| 2008/0086369 A1 | 4/2008 | Kiat et al. | |
| 2008/0104535 A1 * | 5/2008 | DeLine et al. | 715/785 |
| 2008/0109764 A1 | 5/2008 | Linnamaki | |
| 2008/0141126 A1 * | 6/2008 | Johnson et al. | 715/273 |
| 2008/0165209 A1 | 7/2008 | Kondo et al. | |
| 2008/0181498 A1 | 7/2008 | Swenson et al. | |
| 2008/0200153 A1 | 8/2008 | Fitzpatrick et al. | |
| 2008/0229352 A1 | 9/2008 | Pino et al. | |
| 2008/0244422 A1 * | 10/2008 | Hilgers et al. | 715/763 |
| 2009/0031247 A1 | 1/2009 | Walter et al. | |
| 2009/0183083 A1 | 7/2009 | Hedges | |
| 2009/0183103 A1 | 7/2009 | McCartie et al. | |
| 2009/0222754 A1 | 9/2009 | Phillips et al. | |
| 2009/0254399 A1 | 10/2009 | Cristol | |
| 2009/0307721 A1 * | 12/2009 | Afram | H04N 5/44543 725/34 |
| 2009/0316198 A1 | 12/2009 | Takeuchi et al. | |
| 2009/0319888 A1 * | 12/2009 | Oygard | G06F 17/211 715/252 |
| 2010/0031169 A1 * | 2/2010 | Jang | G06F 1/1624 715/760 |
| 2010/0031366 A1 | 2/2010 | Knight et al. | |
| 2010/0138756 A1 * | 6/2010 | Saund | H04L 12/1827 715/758 |
| 2012/0137200 A1 * | 5/2012 | Shar et al. | 715/202 |
| 2013/0124953 A1 * | 5/2013 | Fan et al. | 715/202 |
| 2013/0232148 A1 * | 9/2013 | MacDonald | G06F 17/30873 707/740 |
| 2013/0325463 A1 | 12/2013 | Greenspan et al. | |

OTHER PUBLICATIONS

International Preliminary Report on Patentability, dated Jan. 25, 2011, received in International Patent Application No. PCT/US2008/082986, 6 pages.

Fails, "Mobile Collaboration for Young Children," Human-Computer Interaction Lab, Computer Science Department, University of Maryland, College Park, MD, Apr. 19, 2007, 4 pages.

Hinckley et al., "Stitching: Pen Gestures that Span Multiple Displays," Microsoft Research, Redmond, WA, May 2, 2004, 9 pages.

Rekimoto, "Pick-and-Drop: A Direct Manipulation Technique for Multiple Computer Environments," Sony Computer Science Laboratory Inc., Tokyo, Japan, Nov. 18, 1997, 9 pages.

Streitz et al., "Roomware®—The Second Generation," Integrated Publication and Information Systems Institute (IPSI), Darmstadt, Germany, 2 pages.

(56) References Cited

OTHER PUBLICATIONS

Office Action, dated Sep. 16, 2010, received in U.S. Appl. No. 11/948,806, 11 pages.
Final Office Action, dated Feb. 28, 2011, received in U.S. Appl. No. 11/948,806, 10 pages.
Office Action, dated Oct. 19, 2011, 2010, received in U.S. Appl. No. 11/948,806, 10 pages.
Final Office Action, dated Aug. 2, 2012, received in U.S. Appl. No. 11/948,806, 13 pages.
Office Action, dated Dec. 21, 2012, received in U.S. Appl. No. 11/948,806, 11 pages.
Final Office Action, dated Sep. 11, 2013, received in U.S. Appl. No. 11/948,806, 14 pages.
Office Action, dated Apr. 14, 2011, received in U.S. Appl. No. 12/180,485, 18 pages.
Final Office Action, dated Oct. 31, 2011, received in U.S. Appl. No. 12/180,485, 18 pages.
Office Action, dated Apr. 12, 2012, received in U.S. Appl. No. 12/180,485, 18 pages.
Final Office Action, dated Dec. 31, 2012, received in U.S. Appl. No. 12/180,485, 19 pages.
Office Action, dated May 24, 2013, received in U.S. Appl. No. 12/180,485, 20 pages.
Final Office Action, dated Dec. 4, 2013, received in U.S. Appl. No. 12/180,485, 23 pages.
Office Action, dated Jul. 18, 2014, received in U.S. Appl. No. 12/180,485, 23 pages.
Final Office Action, dated Feb. 12, 2015, received in U.S. Appl. No. 12/180,485, 18 pages.
Office Action, dated Jul. 20, 2012, received in U.S. Appl. No. 12/836,427, 19 pages.
Final Office Action, dated Feb. 15, 2013, received in U.S. Appl. No. 12/836,427, 19 pages.
Office Action, dated Oct. 7, 2013, received in U.S. Appl. No. 12/836,427, 19 pages.
Final Office Action, dated Jul. 17, 2014, received in U.S. Appl. No. 12/836,427, 22 pages.
Office Action, dated Apr. 6, 2015, received in U.S. Appl. No. 12/836,427, 8 pages.
International Search Report and Written Opinion, dated Jan. 16, 2009, received in International Patent Application No. PCT/US2008/082982, which corresponds with U.S. Appl. No. 11/948,806, 6 pages.
International Preliminary Report on Patentability, dated Jun. 1, 2010, received in International Patent Application No. PCT/US2008/082982, 6 pages.
International Search Report and Written Opinion, dated Jan. 16, 2009, received in International Patent Application No. PCT/US2008/082986, which corresponds with U.S. Appl. No. 12/180,485, 7 pages.
International Preliminary Report on Patentability, dated Jan. 25, 2011, received in International Patent Application No. PCT/US2008/082986, 7 pages.
International Preliminary Report on Patentability, dated Nov. 6, 2012, received in International Patent Application No. PCT/US2011/035010, 6 pages.

\* cited by examiner

SYSTEMS, METHODS, AND COMPUTER PROGRAM PRODUCTS PROVIDING AN INTEGRATED USER INTERFACE FOR READING CONTENT

CROSS-REFERENCE TO RELATED APPLICATIONS

The present application is related to U.S. patent application Ser. No. 12/772,752, filed May 3,2010 and entitled, "SYSTEMS, METHODS, AND COMPUTER PROGRAM PRODUCTS PROVIDING AN ARTICLE SELECTION STRUCTURE," which is incorporated by reference herein in its entirety.

TECHNICAL FIELD

The present disclosure relates, in general, to user interfaces and, more specifically, for user interfaces for reading content.

BACKGROUND

In the last decade people have changed the way they consume content. One big shift is the ubiquity of smart phones and other handheld devices that offer access to web-based content and media applications ("apps"). However, handheld devices tend to have limitations. In particular, people tend to use phones for short bursts of time. In one example, a user is waiting in a line and pulls out his or her phone to use for ninety seconds or so. The user may read an article or search for a particular small piece of information. In general, handheld content consumption tends to be quite targeted. It is generally assumed that, because the screen is kept small, handheld devices are annoying to use. Users typically do not want to use handheld devices or for significant content consumption. Of course, the above-described phenomenon is a generality, and some users employ handheld devices for more than that, but the above-described use is the preferred use modality.

Recently, tablet or slate computers have become increasingly popular. Tablet computers usually have a touchscreen about the size of a typical laptop computer's screen or larger while omitting an integrated, physical keyboard. The tablet computer provides a virtual keyboard upon the touchscreen when needed. In general, tablet computers have a slightly different use modality than do handheld devices or laptops because of their larger screens. It would be helpful to have user interfaces for consuming content that are especially convenient for use with tablet computers.

BRIEF SUMMARY

Various embodiments of the invention include systems, methods, and computer program products to provide a Graphical User Interface (GUI) that has independently-scrollable and coordinated columns, where one column has text and another column has graphical elements (e.g., still pictures, video, ads, interactive "widgets", 3D models, and/or the like.—implemented with HTML, flash or other plugins).

Various embodiments of the invention separate graphical elements from text and treat them differently. In one example, the text of an article is presented on one side, and the graphical elements are presented on the other side. The graphical elements from multiple articles are presented in one continuous column, and the text from the multiple articles is presented in another continuous column. The graphical elements give the user a sense of what the various articles are about by showing the content of the graphical elements. The graphical elements can also be used as a navigation mechanism for letting the user select particular articles to read. In one example, selecting any one of the graphical elements will load the article by scrolling the text column to align the text associated with the selected graphical element. Similarly, the text column can be scrolled and a text portion selected to load an article. When a text portion is selected, the graphical element column is automatically scrolled to align the graphical elements of the selected article with the text.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
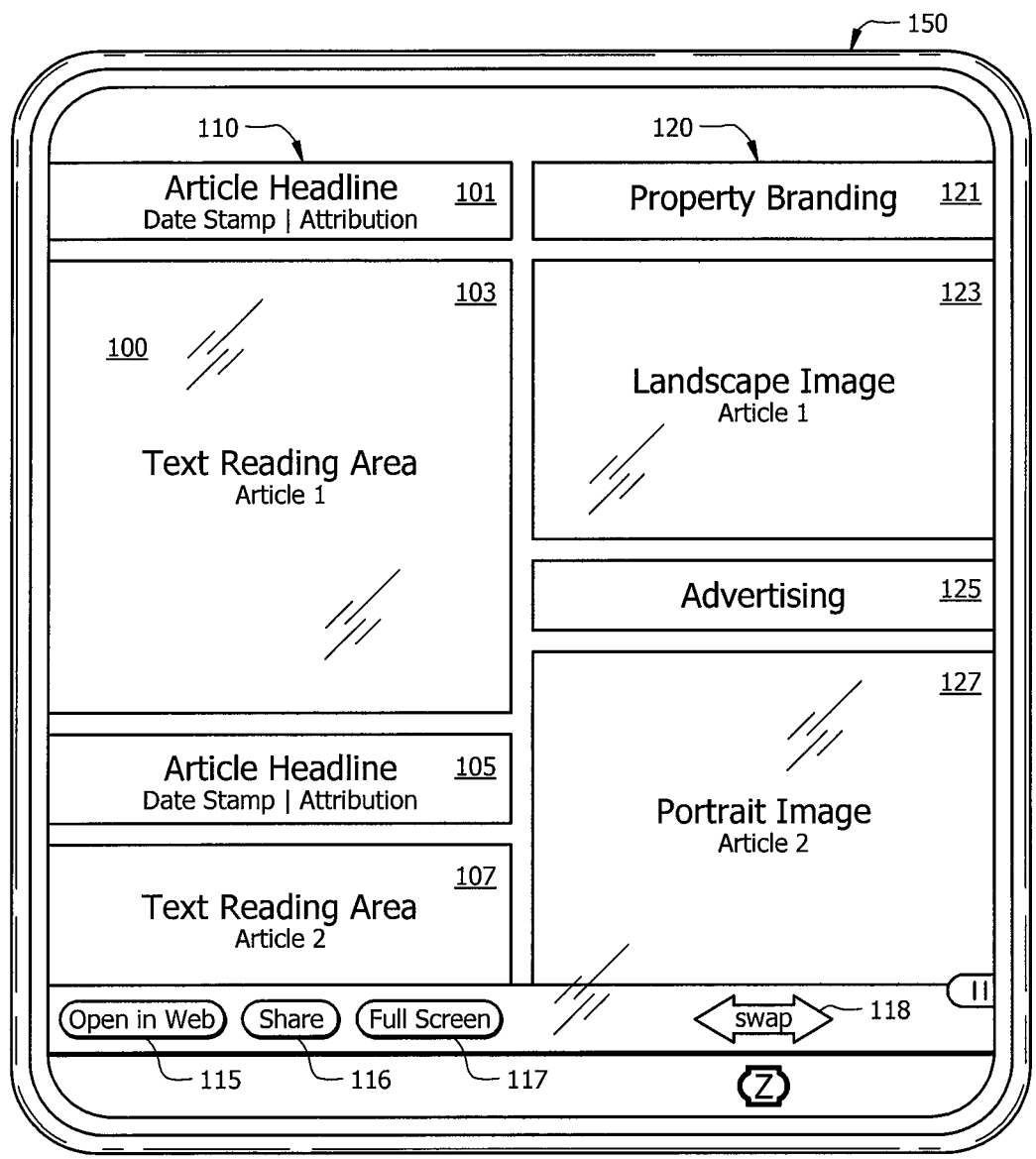
FIG. 1 is an illustration of an exemplary Graphical User Interface (GUI) adapted according to one embodiment of the invention.

FIG. 1 is an illustration of exemplary Graphical User Interface (GUI) 100 adapted according to one embodiment of the invention. In one example, GUI 100 is presented upon a display screen of processor-based device 150. Appropriate processor-based devices include but are not limited to laptop computers, desktop computers, tablet computers (e.g., the iPad™, available from Apple), and portable devices. Some embodiments are especially adapted for use with touchscreen devices, though the scope of embodiments is not so limited, as devices that use computer pointing devices (e.g., a mouse or touchpad) may be adapted for use in some designs as well. In some embodiments, GUI 100 is part of app that is downloaded and run on a processor-based device, while other embodiments may implement GUI 100 as a plug-in for a browser, an interface for a website, and/or the like.

GUI 100 includes a first column 110 and a second column 120, both of which are scrollable. For instance, a user on a touchscreen device may use a finger swipe to move a column up or down within GUI 100, or a user with a mouse may grab and drag a column up or down.

GUI 100 divides the text and graphical elements from articles into two columns. In this particular view, headline 101 and text reading area 103 are part of an article that also includes graphical element 123. Similarly, headline 105 and text reading area 107 are part of an article that also includes graphical element 127. The advertising portion 125 is optional and may or may not be related to either one of the articles. Furthermore, property branding portion 121 is also optional and may or may not be germane to either of the articles. The arrangement of FIG. 1 is exemplary and non-limiting. Other embodiments may include two or more graphical elements for any given article (rather than just one), and property branding portions and advertising portions may be more or less numerous or arranged in different ways than that shown in FIG. 1.

Furthermore, column 110 includes the text from at least two articles, and it is understood that in some embodiments column 110 can scroll up or down to access any number of articles. Column 120 includes graphical elements from at least two articles, and in some embodiments may include graphical elements from any number of articles. FIG. 1 shows two articles for ease of illustration, though GUI 100 can be designed to include as many articles as a user desires.

A human user is presented articles through GUI 100 in a novel manner. The user sees the articles by text, perhaps the article text itself and/or a title/abstract structure. The user also sees the articles by the graphical elements associated therewith. The user can select an article either by selecting an entry in column 110 or in column 120. In one example, the user desires to choose content by graphical elements, so the user scrolls through column 120 until he or she sees a graphical element that looks interesting. The user then selects the graphical element by, for example, tapping the graphical element, using a mouse click, or positioning the graphical element at the top or center of the screen and waiting a specified amount of time, though the particular scope of embodiments is not limited to any technique for selecting a graphical element. When the user selects a graphical element, GUI 100 brings up the text associated with that graphical element.

In another example, the user desires to choose an article based on the text portions in column 110. The user scrolls through column 110 and selects an entry. GUI 100 automatically scrolls an associated graphical element to the top to bring up the article.

Additionally or alternatively, a user can browse through either one of columns 110 and 120 as the other column automatically adjusts to align with the column that is scrolled by the user. For instance, as a user swipes to browse column 120, and GUI 100 automatically aligns column 110 so that the appropriate text portions are aligned with the graphical elements as the graphical elements move. In any event, the GUI 100 provides an automated technique to align content as a user's attention moves from one article to another.

Though GUI 100 is centered around scrolling functions, various embodiments do not preclude the use of other navigation techniques. For instance, the embodiment of FIG. 1 includes buttons 115-118 for navigating. Button 115 provides for the selected article to be opened in an embedded web browser; button 116 allows an article to be shared by email, Multi Media Messaging Service (MMS), or other way; button 117 allows one column 110, 120 or the other to be expanded to the full screen. Button 118 allows the columns 110, 120 to be swapped in place to accommodate right- and left-handed users equitably. In an additional example, though not shown, a button can be provided for going to the next article. Buttons 115-118 are exemplary, as other types of interfaces and functions can be adapted for use by various embodiments.

Figure 2:
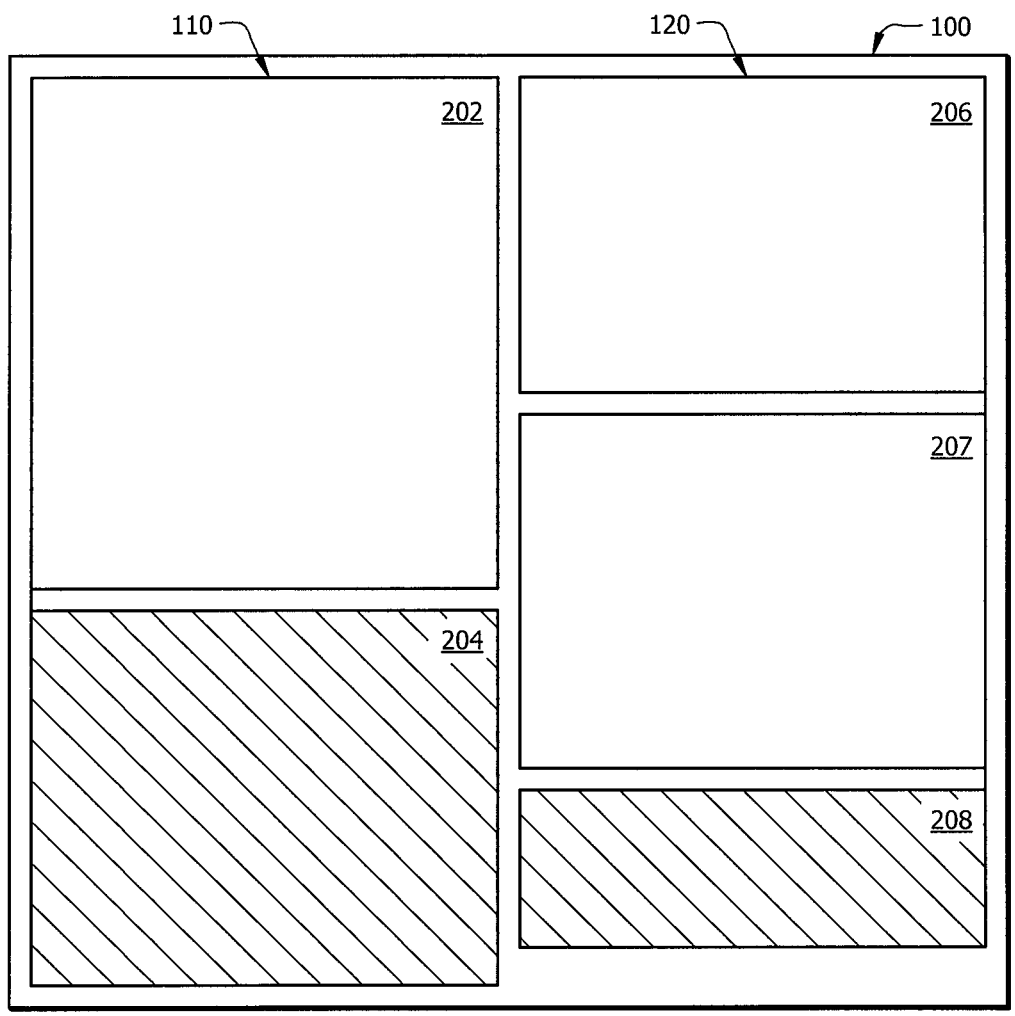
FIG. 2 shows the exemplary GUI of FIG. 1 with visual effects adapted according to one embodiment.

Various visual effects may be included in some embodiments to add a more user-friendly and intuitive feel to GUI 100. An example of a visual effect is emphasizing pictures and texts from selected articles while de-emphasizing pictures and text from unselected articles. FIG. 2 shows exemplary GUI 100 with visual effects adapted according to one embodiment. In FIG. 2, text portion 202 is associated with a selected article, as are graphical elements 206 and 207. By contrast, text portion 204 and graphical element 208 are displayed upon GUI 100 but are not selected.

Text portion 202 and graphical elements 206, 207 are rendered with full fidelity, whereas text portion 204 and graphical element 208 are rendered with reduced fidelity. For example, text portion 204 and graphical element 208 might be rendered partially transparent or partially faded to white or some other color for de-emphasis, and other renderings are possible to represent activity or inactivity. Additionally or alternatively, visual effects may also be added to text portion 202 and graphical elements 206, 207, e.g., a frame or visual decoration around the border of text portion 202 and graphical elements 206, 207. The visual effects can be adjusted as other articles are selected and/or columns 110, 120 are scrolled.

Figure 3:
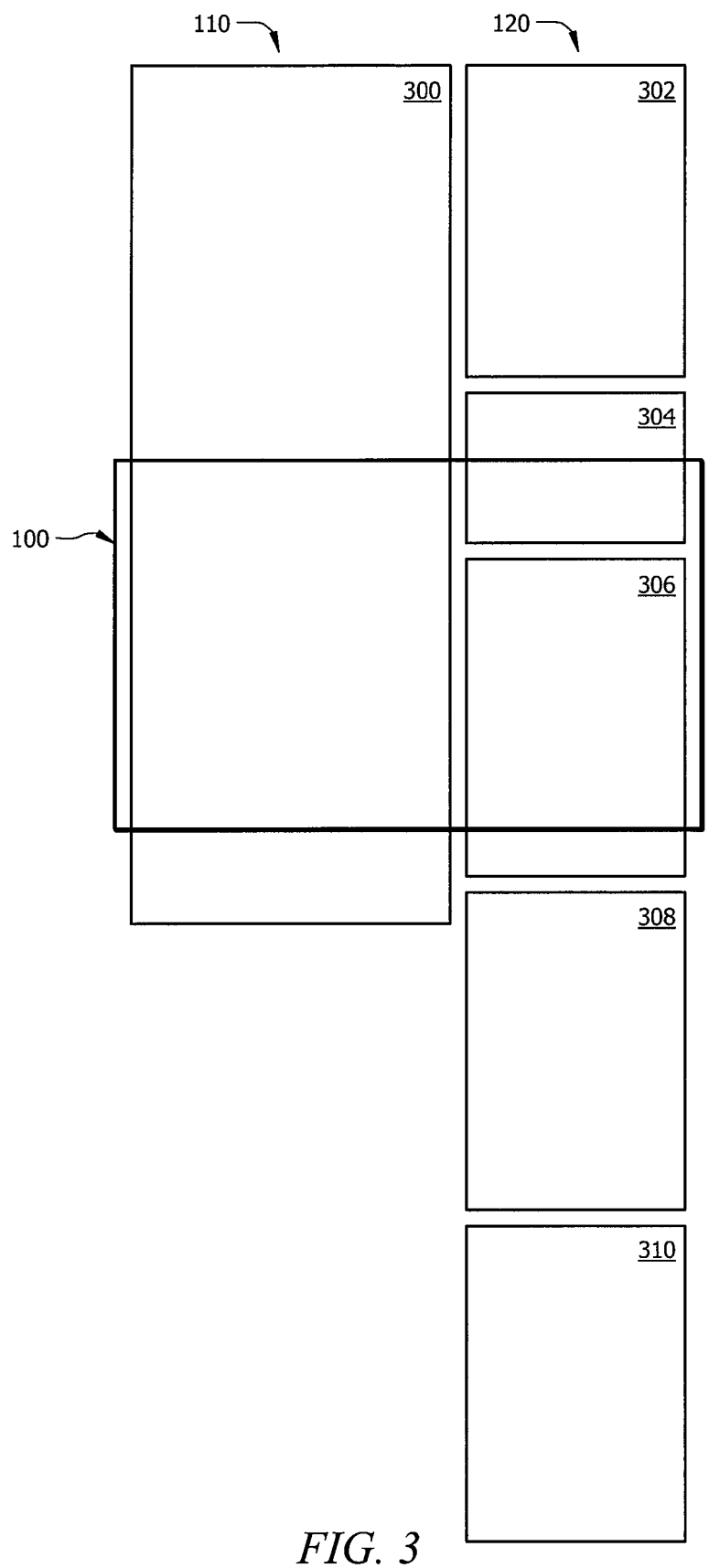
FIG. 3 shows the GUI of FIG. 1 with two columns operating according to one exemplary embodiment of the invention.

Various embodiments also automatically align the content of an article as a user scrolls within the article. FIG. 3 shows GUI 100 with columns 110, 120 operating according to one exemplary embodiment of the invention. In this example, the text portion 300 is longer than the screen upon which GUI 100 is rendered; therefore, scrolling is necessary to view all of the text portion. Similarly, the article has five pictures 302-310 that span an area longer than the screen, so scrolling is also necessary in order to see all of the pictures 302-310. In this example, as the user scrolls column 110, the graphical elements 302-310 in column 320 are scrolled at a rate proportional to that of the text and appropriate for the number of graphical elements. Thus, as the bottom of the text portion 300 is reached, the last picture 310 is reached as well. Additionally or alternatively, one or more of the graphical elements 302-310 are cued to sections within text portion 300 so that as those sections are scrolled within view, the appropriate graphical elements are aligned as well. Furthermore, should the user scroll through column 120, text box 110 is also scrolled proportionately and/or by cues to synchronize text and graphical element.

In one example, a user manually scrolls while reading an article. In the example of a touchscreen tablet computer, the user drags his or her thumb up the text portion 300 while reading. If there is just one graphical element associated with the article, then in one example, the graphical element stays stationary until the user gets to the end of the article, at which point the graphical element switches over to another graphical element. In another example, when more than fifty percent of the scrolling area is the next article, then the graphical element alpha fades as the next graphical element associated with the article shows up. The same techniques can be used for text portions as a user scrolls the graphical elements. Any manner of transitioning between articles can be used by various embodiments.

FIG. 400 is an illustration of exemplary GUI 400 adapted according to one embodiment of the invention. GUI 400 operates in a similar manner to GUI 100 of FIG. 1. For instance, GUI 400 includes column 410 for text portions of articles and column 420 for graphical elements of articles. As in FIG. 1, columns 410, 420 can be independently scrolled and are coordinated so as to automatically align the content of a particular article.

Figure 4:
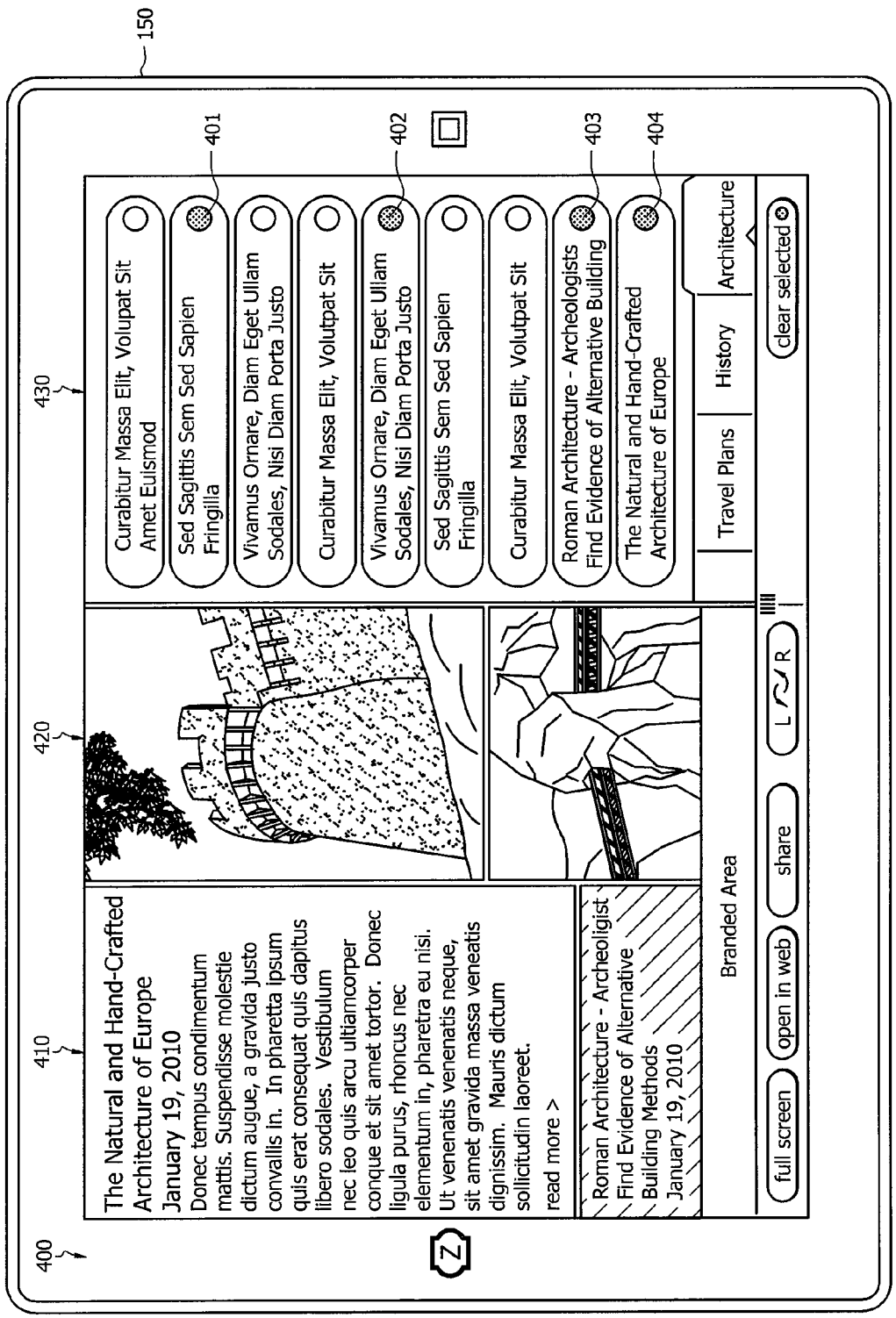
FIG. 4 is an illustration of an exemplary GUI adapted according to one embodiment of the invention.

GUI 400 also includes column 430, integrated in GUI 400 with columns 410, 420. The items in column 430 correspond to available articles. A user can select one, some, all, or none of the available articles to be viewed. Upon selection, an article is divided into text and graphics and distributed in columns 410, 420. Column 430 includes indicators showing which of the articles have been selected and are available for viewing in columns 410, 420. Specifically, column 430 includes circles that when filled in, colored, or otherwise visually marked, indicate that a corresponding article has been selected. In FIG. 4, circles 401-404 are visually marked to indicate having been selected. The operation of a feature, such as that shown in column 430, is described in more detail in U.S. patent application Ser. No. 12/772,752, filed concurrently herewith and entitled, "SYSTEMS, METHODS, AND COMPUTER PROGRAM PRODUCTS PROVIDING AN ARTICLE SELECTION STRUCTURE," which is incorporated by reference herein in its entirety.

Figure 5:
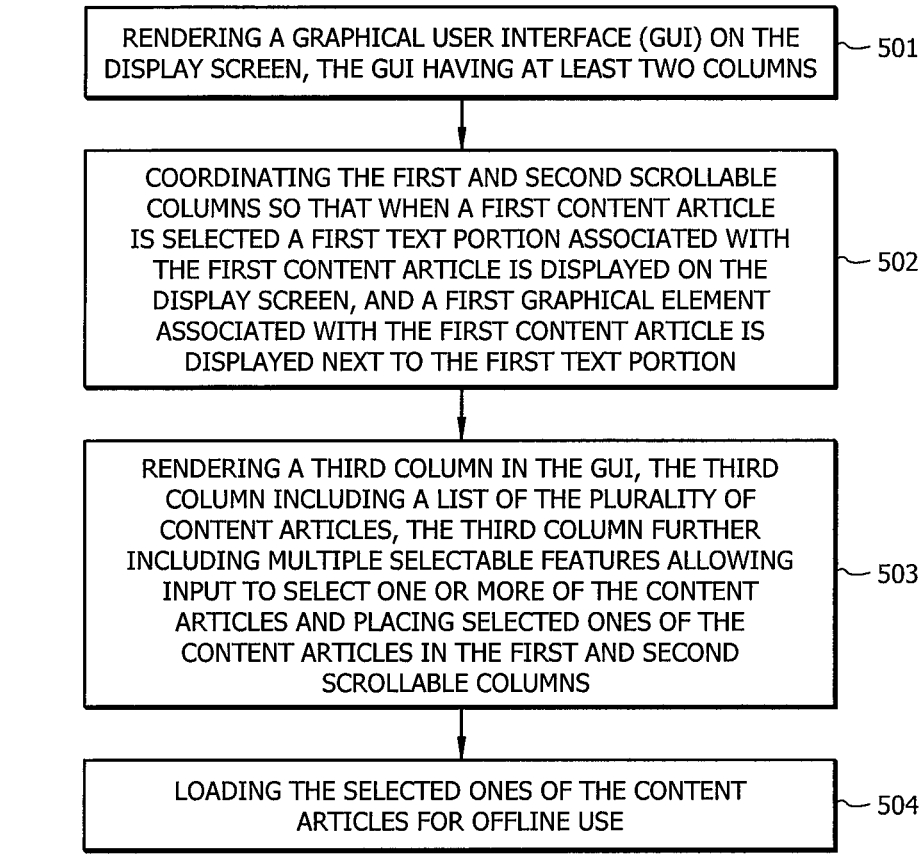
FIG. 5 is an illustration of an exemplary method adapted according to one embodiment of the invention.

FIG. 5 is an illustration of exemplary method 500 adapted according to one embodiment of the invention. Method 500 may be performed, for example, by a processor-based device executing a program that instantiates the functional modules shown in FIG. 6.

In block 501, a GUI is rendered on a display screen. The GUI has a first scrollable column with multiple graphical elements arranged sequentially within the first column, each graphical element of the plurality of graphical elements associated with at least one article of a plurality of content articles. The GUI also has a second scrollable column with a plurality of independent text portions, each of the text portions corresponding to a respective article.

In block 502, the first and second scrollable columns are coordinated so that when a first article is selected a first text portion associated with the first article is displayed on the display screen, and a first graphical element associated with the first article is displayed next to the first text portion. In one example, the graphical elements are scrolled though, and the text column is scrolled as well to align with the graphical elements. In another example, the text portions are scrolled through, and the graphical elements are scrolled as well to align with the text. Thus, when a user selects an article for attention, the text and graphical element of that article are synchronized so that the user sees both in an intuitive manner.

In block 503, a third column is rendered in the GUI, the third column including a list of the content articles. The third column also has multiple selectable features allowing user input to select one or more of the content articles. When an article is selected, it is placed in the first and second scrollable columns. An example of the third column is column 430 of FIG. 4.

In block 504, the selected content articles are loaded for offline use. For example, the selected articles can be placed in memory and retrieved for access later, whether the computer is online or offline.

Various embodiments are not limited to the exact method shown in FIG. 5. Various embodiments may add, omit, rearrange, or modify actions. For instance, many embodiments will render the three columns perceptibly simultaneously, so that actions of block 503 are performed with actions of block 501. Furthermore, it is understood that the items in the first scrollable column may include any type of graphical element, so that one or more videos or other presentations may be placed in the first scrollable column to accompany text content in the first column. Additionally, the term "article" is used herein in the examples above to refer to magazine or newspaper articles, though the term is not limited thereto. Articles may include other divisions of content, such as book chapters and/or the like.

Figure 6:
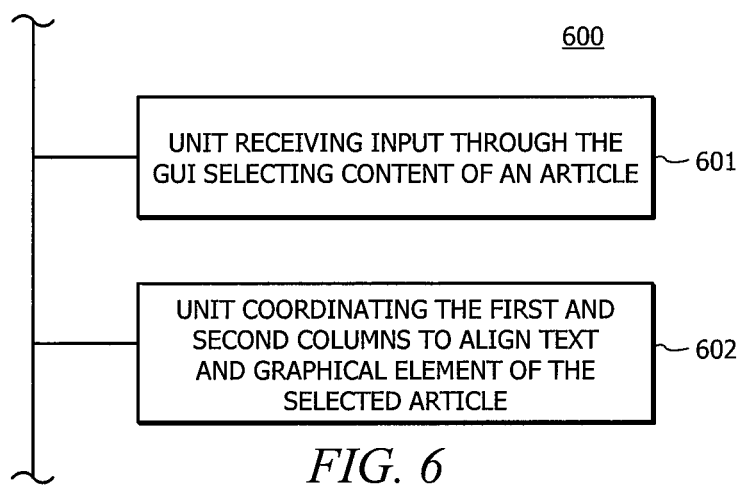
FIG. 6 is an illustration of an exemplary system adapted according to one embodiment of the invention.

FIG. 6 is an illustration of an exemplary system 600 adapted according to one embodiment of the invention. System 600 includes functional modules 601 and 602. The divisions of the functional modules is conceptual and exemplary, as the functions may be performed by a single functional unit or divided between two or more functional units different than those shown in FIG. 6.

Some embodiments include one or more advantages over other techniques. For instance, various embodiments provide a GUI that leverages the capabilities and expected use modalities of tablet computers. The expectation for the tablet or slate category of computers is that they are more likely to be used in a casual, comfortable kind of scenario. In one example, a user is sitting on a couch, lying on a bed, or sitting at a kitchen countertop, perhaps watching television or eating. Instead of reading the back of the cereal box, the user is using the tablet.

It is expected that tablet computers are going to be used in a casual discovery mode where the user has ten minutes or half an hour and wants to browse content for something interesting to pass the time. Various embodiments provide a new and intuitive way for users to consume content, especially on tablet computers. Furthermore, various embodiments are especially useful for newspapers, magazine, blogs, e-books and other syndicated content that provides both text and graphics.

Additionally, various embodiments have desirable ergonomic qualities when used with tablet computers. Tablet computers tend to be heavier than handheld devices (e.g., phones), and are often grasped by a user with one hand while the other hand is used to make gestures on the screen. In some embodiments, a single hand can be used to select among articles by scrolling through one or both columns of text and graphical elements.

In another single-handed use, a user can recline on a couch having one hand on, e.g., a cup of coffee, and with the other hand, the user can both hold the device and thumb-navigate. Also, when placed in the lap, the user may desire to navigate using both thumbs. In some embodiments, a user can access most or all of the GUI with his or her hands at the bottom right and bottom left hand corner of the screen by dragging the columns up and down.

When implemented via computer-executable instructions, various elements of embodiments of the present invention are in essence the software code defining the operations of such various elements. The executable instructions or software code may be obtained from a tangible readable medium (e.g., a hard drive media, optical media, RAM, EPROM, EEPROM, tape media, cartridge media, flash memory, ROM, memory stick, and/or the like). In fact, readable media can include any medium that can store information.

Figure 7:
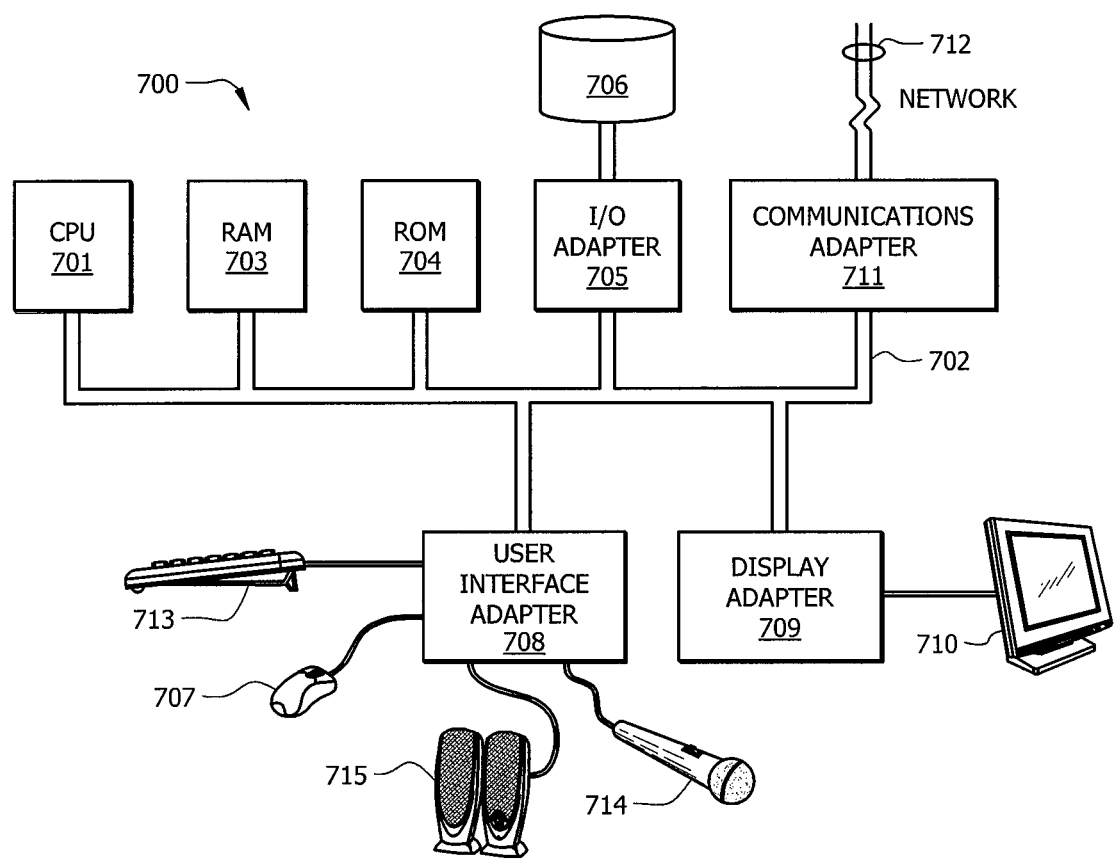
FIG. 7 illustrates an example computer system adapted according to one embodiment of the present invention.

FIG. 7 illustrates an example computer system 700 adapted according to one embodiment of the present invention. That is, computer system 700 comprises an example system on which embodiments of the present invention may be implemented (such as processor-based device 150 of FIG. 1). Central processing unit (CPU) 701 is coupled to system bus 702. CPU 701 may be any general purpose or specialized purpose CPU. However, the present invention is not restricted by the architecture of CPU 701 as long as CPU 701 supports the inventive operations as described herein. CPU 701 may execute the various logical instructions according to embodiments of the present invention. For example, one or more CPUs, such as CPU 701, may execute machine-level instructions according to the exemplary operational flows described above in conjunction with FIG. 5.

Computer system 700 also preferably includes random access memory (RAM) 703, which may be SRAM, DRAM, SDRAM, or the like. In this example, computer system 700 uses RAM 703 to buffer 302 of FIG. 3. Computer system 700 preferably includes read-only memory (ROM) 704 which may be PROM, EPROM, EEPROM, or the like. RAM 703 and ROM 704 hold user and system data and programs, as is well known in the art.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information, such as hand gestures (via a touchscreen or a pointing device) that indicate that one or more columns should be scrolled.

I/O adapter 705 preferably connects to storage device(s) 706, such as one or more of hard drive, compact disc (CD) drive, floppy disk drive, tape drive, etc. to computer system 700. The storage devices may be utilized when RAM 703 is insufficient for the memory requirements associated with storing media data. Communications adapter 711 is preferably adapted to couple computer system 700 to network 712 (e.g., the Internet, a LAN, a cellular network, etc.). User interface adapter 708 couples user input devices, such as keyboard 713, pointing device 707, and microphone 714 and/ or output devices, such as speaker(s) 715 to computer system 700. Display adapter 709 is driven by CPU 701 to control the display on display device 710 to, for example, display the articles.

While the above examples are provided in the context of tablet computers with touchscreens, the scope of embodiment is not so limited. For instance, some embodiments may be adapted for use with handheld devices, laptop computers, desktop computers, workstations, and/or other process-based devices with a GUI. Additionally, some embodiments can be used with devices that do not have a touchscreen but, instead, rely on another manner of screen navigation, such as pointing, hotkeys, and the like. Moreover, embodiments of the present invention are not limited to general purpose computers and may be implemented on other types of processors, such as application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
at a portable computing device with a touch screen display:
displaying a plurality of articles in a first scrollable column and a second scrollable column on the touch screen display, wherein:
the first scrollable column and the second scrollable column are independently scrollable;
a respective article in the plurality of articles includes text for the respective article, and
one or more graphical elements contained within the respective article that are a distinct subset of the respective article from the text of the respective article;
the text for the respective article is displayed in the first scrollable column on the touch screen display;
the one or more graphical elements contained within the respective article are displayed in the second scrollable column on the touch screen display;
the first scrollable column and the second scrollable column are separate from each other, and are displayed concurrently with each other;
detecting selection of a first article in the plurality of articles;
in response to detecting selection of the first article in the plurality of articles, concurrently displaying text for the selected first article in the first scrollable column and a first graphical element contained within the selected first article in the second scrollable column, next to the text for the selected first article in the first scrollable column; and,
in response to a first input that scrolls the selected first article in either of the first scrollable column or the second scrollable column, automatically concurrently scrolling the other scrollable column, of the first scrollable column and the second scrollable column, at a rate such that an end of the text in the selected first article in the first scrollable column is reached as a last graphical element in the selected first article in the second scrollable column is reached.

2. The method of claim 1, wherein the one or more graphical elements contained within the respective article include still pictures, video, ads, interactive widgets, and/or 3D models.

3. The method of claim 1, wherein the selected first article is concurrently displayed with one or more unselected articles in the plurality of articles and the selected first article is visually emphasized relative to the one or more unselected articles.

4. The method of claim 1, including:
detecting a second input; and,
in response to detecting the second input:
scrolling the first scrollable column to display text for a second article in the plurality of articles, distinct from the text in the selected first article; and
scrolling the second scrollable column to display a second graphical element contained within the second article, distinct from the first graphical element contained within the selected first article, next to the text for the second article in the first scrollable column.

5. The method of claim 4, wherein the second input is a finger swipe on the touch screen display on the first scrollable column or the second is a finger swipe on the touch screen display on the second scrollable column.

6. The method of claim 4, wherein the second is activation of a button for going to a next article in the plurality of articles.

7. The method of claim 1, wherein graphical elements contained within the selected first article are cued to sections within the text for the selected first article, the method including:
   detecting a second input; and,
   in response to detecting the second input:
      scrolling, in the first scrollable column, the text for the selected first article from a first section of text to a second section of text in the selected first article; and
      scrolling, in the second scrollable column, graphical elements contained within the selected first article from a first graphical element cued to the first section of text to a second graphical element cued to the second section of text.

8. A portable computing device, comprising:
   a touch screen display;
   one or more processors;
   memory; and
   one or more programs, wherein the one or more programs are stored in the memory and configured to be executed by the one or more processors, the one or more programs including instructions for:
      displaying a plurality of articles in a first scrollable column and a second scrollable column on the touch screen display, wherein:
         the first scrollable column and the second scrollable column are independently scrollable;
         a respective article in the plurality of articles includes text for the respective article, and
            one or more graphical elements contained within the respective article that are a distinct subset of the respective article from the text of the respective article;
         the text for the respective article is displayed in the first scrollable column on the touch screen display;
         the one or more graphical elements contained within the respective article are displayed in the second scrollable column on the touch screen display;
         the first scrollable column and the second scrollable column are separate from each other, and are displayed concurrently with each other;
      detecting selection of a first article in the plurality of articles;
      in response to detecting selection of the first article in the plurality of articles, concurrently displaying text for the selected first article in the first scrollable column and a first graphical element contained within the selected first article in the second scrollable column, next to the text for the selected first article in the first scrollable column; and,
      in response to a first input that scrolls the selected first article in either of the first scrollable column or the second scrollable column, automatically concurrently scrolling the other scrollable column, of the first scrollable column and the second scrollable column, at a rate such that an end of the text in the selected first article in the first scrollable column is reached as a last graphical element in the selected first article in the second scrollable column is reached.

9. The device of claim 8, wherein the one or more graphical elements contained within the respective article include still pictures, video, ads, interactive widgets, and/or 3D models.

10. The device of claim 8, wherein the selected first article is concurrently displayed with one or more unselected articles in the plurality of articles and the selected first article is visually emphasized relative to the one or more unselected articles.

11. The device of claim 8, including instructions for:
   detecting a second input; and,
   in response to detecting the second input:
      scrolling the first scrollable column to display text for a second article in the plurality of articles, distinct from the text in the selected first article; and
      scrolling the second scrollable column to display a second graphical element contained within the second article, distinct from the first graphical element contained within the selected first article, next to the text for the second article in the first scrollable column.

12. The device of claim 8, wherein the second input is a finger swipe on the touch screen display on the first scrollable column or the second input is a finger swipe on the touch screen display on the second scrollable column.

13. The device of claim 8, wherein the second input is activation of a button for going to a next article in the plurality of articles.

14. The device of claim 8, wherein graphical elements contained within the selected first article are cued to sections within the text for the selected first article, the device including instructions for:
   detecting a second input; and,
   in response to detecting the second input:
      scrolling, in the first scrollable column, the text for the selected first article from a first section of text to a second section of text in the selected first article; and
      scrolling, in the second scrollable column, graphical elements contained within the selected first article from a first graphical element cued to the first section of text to a second graphical element cued to the second section of text.

15. A non-transitory computer readable storage medium storing one or more programs, the one or more programs comprising instructions, which when executed by a portable computing device with a touch screen display, cause the device to:
   display a plurality of articles in a first scrollable column and a second scrollable column on the touch screen display, wherein:
      the first scrollable column and the second scrollable column are independently scrollable;
      a respective article in the plurality of articles includes text for the respective article, and
         one or more graphical elements contained within the respective article that are a distinct subset of the respective article from the text of the respective article;
      the text for the respective article is displayed in the first scrollable column on the touch screen display;
      the one or more graphical elements contained within the respective article are displayed in the second scrollable column on the touch screen display;
      the first scrollable column and the second scrollable column are separate from each other, and are displayed concurrently with each other;

detecting selection of a first article in the plurality of articles;

in response to detecting selection of the first article in the plurality of articles, concurrently displaying text for the selected first article in the first scrollable column and a first graphical element contained within the selected first article in the second scrollable column, next to the text for the selected first article in the first scrollable column; and, in response to a first input that scrolls the selected first article in either of the first scrollable column or the second scrollable column, automatically concurrently scrolling the other scrollable column, of the first scrollable column and the second scrollable column, at a rate such that an end of the text in the selected first article in the first scrollable column is reached as a last graphical element in the selected first article in the second scrollable column is reached.

16. The computer readable storage medium of claim 15, wherein the one or more graphical elements contained within the respective article include still pictures, video, ads, interactive widgets, and/or 3D models.

17. The computer readable storage medium of claim 15, wherein the selected first article is concurrently displayed with one or more unselected articles in the plurality of articles and the selected first article is visually emphasized relative to the one or more unselected articles.

18. The computer readable storage medium of claim 15, including instructions, which when executed by the portable computing device with the touch screen display, cause the device to:

detect a second input; and,
in response to detecting the second input:
scroll the first scrollable column to display text for a second article in the plurality of articles, distinct from the text in the selected first article; and
scroll the second scrollable column to display a second graphical element contained within the second article, distinct from the first graphical element contained within the selected first article, next to the text for the second article in the first scrollable column.

19. The computer readable storage medium of claim 15, wherein the second input is a finger swipe on the touch screen display on the first scrollable column or the second input is a finger swipe on the touch screen display on the second scrollable column.

20. The computer readable storage medium of claim 15, wherein the second input is activation of a button for going to a next article in the plurality of articles.

21. The computer readable storage medium of claim 15, wherein graphical elements contained within the selected first article are cued to sections within the text for the selected first article, the computer readable storage medium including instructions, which when executed by the portable computing device with the touch screen display, cause the device to:

detect a second input; and,
in response to detecting the second input:
scroll, in the first scrollable column, the text for the selected first article from a first section of text to a second section of text in the selected first article; and
scroll, in the second scrollable column, graphical elements contained within the selected first article from a first graphical element cued to the first section of text to a second graphical element cued to the second section of text.

* * * * *